United States Patent
Oren et al.

(10) Patent No.: US 9,312,938 B2
(45) Date of Patent: Apr. 12, 2016

(54) METHOD AND SYSTEM FOR IMPROVING UPLINK PERFORMANCE

(75) Inventors: Yair Oren, Washington, DC (US); Ofer Saban, Meshek (IL)

(73) Assignee: Corning Optical Communications Wireless Ltd, Airport (IL)

(*) Notice: Subject to any disclaimer, the term of this patent is extended or adjusted under 35 U.S.C. 154(b) by 1639 days.

(21) Appl. No.: 12/033,252

(22) Filed: Feb. 19, 2008

(65) Prior Publication Data

US 2008/0200117 A1 Aug. 21, 2008

Related U.S. Application Data

(60) Provisional application No. 60/890,587, filed on Feb. 19, 2007.

(51) Int. Cl.
*H04B 7/04* (2006.01)
*H04B 7/02* (2006.01)
(Continued)

(52) U.S. Cl.
CPC .............. *H04B 7/0491* (2013.01); *H04B 1/109* (2013.01); *H04B 1/1027* (2013.01); *H04B 7/024* (2013.01); *H04B 7/0874* (2013.01); *H04B 15/00* (2013.01); *H04L 1/06* (2013.01)

(58) Field of Classification Search
CPC .............. H03M 13/6561; H04B 1/707; H04B 7/15592; H04B 7/2606; H04J 11/0053; H04W 84/047; H04N 21/6118; H04N 21/6131; H04N 21/64707
USPC ............. 455/277.1, 277.2, 562.1, 273, 278.1, 455/272, 132, 561; 370/339, 347, 480, 343; 375/267, 299, 347, 260, 295, 346, 340
See application file for complete search history.

(56) References Cited

U.S. PATENT DOCUMENTS 4,041,396 A 8/1977 Fedde
4,523,155 A 6/1985 Walczak et al.
(Continued)

FOREIGN PATENT DOCUMENTS

EP 0 355 328 A2 2/1990
EP 0 709 974 A1 5/1996
(Continued)

OTHER PUBLICATIONS

International Search Report dated Aug. 21, 2008.
(Continued)

*Primary Examiner* — Sujatha Sharma
(74) *Attorney, Agent, or Firm* — C. Keith Montgomery

(57) ABSTRACT

The present invention is directed to improvements for distributed antenna systems and more particularly to methods and systems for improving uplink communications. In one embodiment, Aggregation Point Noise Blocking provides for blocking or filtering the noise contributed by one or more of the branches coupled to an aggregation point that are not carrying the signal from a particular terminal. Signal activity from a given terminal on a particular branch can be identified and that information can be used to selectively block or filter the signal noise contributed by the other branches to an aggregation point. The selective blocking or filtering can also include an attenuation function to attenuate the signal and provide dynamic range smoothing. In another embodiment the signal can be regenerated to produce a signal that has a restored or very high SNR. An uplink regeneration block can be provided which demodulates the uplink signal to recover the transmitted information and then re-modulates the transmitted information to regenerate a signal at a restored or very high SNR.

18 Claims, 6 Drawing Sheets

(51) Int. Cl.
  *H04B 7/10* (2006.01)
  *H04B 15/00* (2006.01)
  *H04L 1/06* (2006.01)
  *H04B 1/10* (2006.01)
  *H04B 7/08* (2006.01)

(56) References Cited

U.S. PATENT DOCUMENTS

| | | |
|---|---|---|
| 4,602,218 A | 7/1986 | Vilmur et al. |
| 4,617,522 A | 10/1986 | Tarbutton et al. |
| 4,897,613 A | 1/1990 | Rao et al. |
| 5,043,672 A | 8/1991 | Youn |
| 5,091,919 A | 2/1992 | Kuisma |
| 5,126,686 A | 6/1992 | Tam |
| 5,160,898 A | 11/1992 | Black |
| 5,196,806 A | 3/1993 | Ichihara |
| 5,206,655 A | 4/1993 | Caille et al. |
| 5,327,096 A | 7/1994 | Sakamoto et al. |
| 5,337,020 A | 8/1994 | Daughtry et al. |
| 5,339,046 A | 8/1994 | Kornfeld et al. |
| 5,339,184 A | 8/1994 | Tang |
| 5,404,585 A | 4/1995 | Vimpari et al. |
| 5,442,322 A | 8/1995 | Kornfeld et al. |
| 5,471,654 A | 11/1995 | Okazaki et al. |
| 5,493,255 A | 2/1996 | Murtojarvi |
| 5,502,446 A | 3/1996 | Denninger |
| 5,506,544 A | 4/1996 | Staudinger et al. |
| 5,570,065 A | 10/1996 | Eberhardt et al. |
| 5,675,290 A | 10/1997 | Tsukahara et al. |
| 5,677,561 A | 10/1997 | Jensen |
| 5,726,984 A | 3/1998 | Kubler et al. |
| 5,790,536 A | 8/1998 | Mahany et al. |
| 5,796,309 A | 8/1998 | Nguyen |
| 5,809,395 A | 9/1998 | Hamilton-Piercy et al. |
| 5,809,410 A | 9/1998 | Stuebing et al. |
| 5,812,024 A | 9/1998 | Mastrocola |
| 5,854,971 A | 12/1998 | Nagoya et al. |
| 5,859,567 A | 1/1999 | Black |
| 5,873,029 A | 2/1999 | Grondahl et al. |
| 6,049,705 A | 4/2000 | Xue ............... 455/277.1 |
| 6,052,032 A | 4/2000 | Jarvinen et al. |
| 6,087,820 A | 7/2000 | Houghton et al. |
| 6,087,888 A | 7/2000 | Inokuchi |
| 6,100,753 A | 8/2000 | Lee et al. |
| 6,194,268 B1 | 2/2001 | Furukawa et al. |
| 6,194,968 B1 | 2/2001 | Winslow |
| 6,198,432 B1 | 3/2001 | Janky |
| 6,222,503 B1 | 4/2001 | Gietema et al. |
| 6,259,901 B1 | 7/2001 | Shinomiya et al. |
| 6,317,599 B1 | 11/2001 | Rappaport et al. |
| 6,330,244 B1 | 12/2001 | Swartz et al. |
| 6,374,124 B1 | 4/2002 | Slabinski |
| 6,389,010 B1 | 5/2002 | Kubler et al. |
| 6,430,416 B1 | 8/2002 | Loomis |
| 6,452,915 B1 | 9/2002 | Jorgensen |
| 6,580,402 B2 | 6/2003 | Navarro et al. |
| 6,615,074 B2 | 9/2003 | Mickle et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,763,226 B1 | 7/2004 | McZeal, Jr. |
| 6,842,433 B2 | 1/2005 | West et al. |
| 6,850,510 B2 | 2/2005 | Kubler et al. |
| 6,876,056 B2 | 4/2005 | Tilmans et al. |
| 6,895,249 B2 | 5/2005 | Gaal |
| 6,914,539 B2 | 7/2005 | Hoctor et al. |
| 6,919,858 B2 | 7/2005 | Rofougaran |
| 6,920,192 B1 | 7/2005 | Laroia et al. |
| 6,961,312 B2 | 11/2005 | Kubler et al. |
| 7,015,826 B1 | 3/2006 | Chan et al. |
| 7,023,382 B1 | 4/2006 | Akano |
| 7,024,166 B2 | 4/2006 | Wallace et al. |
| 7,039,135 B2 | 5/2006 | Binshtok et al. |
| 7,050,017 B2 | 5/2006 | King et al. |
| 7,053,838 B2 | 5/2006 | Judd |
| 7,123,939 B1 | 10/2006 | Bird et al. |
| 7,132,979 B2 | 11/2006 | Langenberg |
| 7,142,535 B2 | 11/2006 | Kubler et al. |
| 7,199,443 B2 | 4/2007 | Elsharawy |
| 7,251,459 B2 | 7/2007 | McFarland et al. |
| 7,257,220 B1* | 8/2007 | Marshall et al. ............... 379/339 |
| 7,315,735 B2 | 1/2008 | Graham |
| 7,359,674 B2 | 4/2008 | Markki et al. |
| 7,366,151 B2 | 4/2008 | Kubler et al. |
| 7,369,526 B2 | 5/2008 | Lechleider et al. |
| 7,412,224 B2 | 8/2008 | Kotola et al. |
| 7,451,365 B2 | 11/2008 | Wang et al. |
| 7,460,507 B2 | 12/2008 | Kubler et al. |
| 7,542,452 B2 | 6/2009 | Penumetsa |
| 7,551,641 B2 | 6/2009 | Pirzada et al. |
| 7,554,964 B2* | 6/2009 | Bolgiano et al. ............... 370/342 |
| 7,557,758 B2 | 7/2009 | Rofougaran |
| 7,580,384 B2 | 8/2009 | Kubler et al. |
| 7,586,861 B2 | 9/2009 | Kubler et al. |
| 7,599,420 B2 | 10/2009 | Forenza et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,680,462 B2 | 3/2010 | Wong et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,809,012 B2 | 10/2010 | Ruuska et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,853,234 B2 | 12/2010 | Afsahi |
| 7,869,828 B2 | 1/2011 | Wang et al. |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,920,553 B2 | 4/2011 | Kubler et al. |
| 7,924,783 B1 | 4/2011 | Mahany et al. |
| 7,936,713 B2 | 5/2011 | Kubler et al. |
| 7,937,110 B2 | 5/2011 | Wu et al. |
| 7,949,364 B2 | 5/2011 | Kasslin et al. |
| 7,957,777 B1 | 6/2011 | Vu et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,457,562 B2 | 6/2013 | Zavadsky et al. |
| 2001/0016504 A1* | 8/2001 | Dam et al. .................. 455/562 |
| 2002/0123365 A1 | 9/2002 | Thorson et al. |
| 2002/0147978 A1* | 10/2002 | Dolgonos et al. ............... 725/62 |
| 2003/0148747 A1 | 8/2003 | Yamamoto |
| 2004/0100930 A1 | 5/2004 | Shapira et al. |
| 2004/0102196 A1 | 5/2004 | Weckstrom et al. |
| 2004/0146020 A1 | 7/2004 | Kubler et al. |
| 2004/0151164 A1 | 8/2004 | Kubler et al. |
| 2004/0160912 A1 | 8/2004 | Kubler et al. |
| 2004/0160913 A1 | 8/2004 | Kubler et al. |
| 2004/0165573 A1 | 8/2004 | Kubler et al. |
| 2004/0204105 A1* | 10/2004 | Liang et al. ............... 455/562.1 |
| 2005/0147071 A1 | 7/2005 | Karaoguz et al. |
| 2006/0056283 A1 | 3/2006 | Anikhindi et al. |

(56) References Cited

U.S. PATENT DOCUMENTS

| | | |
|---|---|---|
| 2006/0128425 A1 | 6/2006 | Rooyen |
| 2006/0223577 A1 | 10/2006 | Ouzillou |
| 2006/0262014 A1 | 11/2006 | Shemesh et al. |
| 2006/0274704 A1 | 12/2006 | Desai et al. |
| 2006/0276227 A1 | 12/2006 | Dravida |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0173282 A1 | 7/2007 | Noda et al. |
| 2007/0224954 A1 | 9/2007 | Gopi |
| 2007/0243832 A1 | 10/2007 | Park et al. |
| 2007/0264009 A1 | 11/2007 | Sabat, Jr. et al. |
| 2007/0274279 A1* | 11/2007 | Wood et al. ............... 370/343 |
| 2007/0297005 A1 | 12/2007 | Montierth et al. |
| 2008/0043714 A1 | 2/2008 | Pernu |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0207253 A1 | 8/2008 | Jaakkola et al. |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0059903 A1 | 3/2009 | Kubler et al. |
| 2009/0061796 A1 | 3/2009 | Arkko et al. |
| 2009/0067402 A1* | 3/2009 | Forenza et al. ............... 370/343 |
| 2009/0073916 A1 | 3/2009 | Zhang et al. |
| 2009/0149221 A1 | 6/2009 | Liu et al. |
| 2009/0175214 A1* | 7/2009 | Sfar et al. ............... 370/315 |
| 2009/0218407 A1 | 9/2009 | Rofougaran |
| 2009/0218657 A1 | 9/2009 | Rofougaran |
| 2009/0232507 A1* | 9/2009 | Gupta et al. ............... 398/115 |
| 2009/0239491 A1 | 9/2009 | Bargroff et al. |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0291653 A1 | 11/2009 | Suzuki et al. |
| 2010/0002626 A1 | 1/2010 | Schmidt et al. |
| 2010/0027443 A1 | 2/2010 | LoGalbo et al. |
| 2010/0056200 A1 | 3/2010 | Tolonen |
| 2010/0067431 A1* | 3/2010 | McNeely ............... 370/316 |
| 2010/0077275 A1* | 3/2010 | Yu et al. ............... 714/752 |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0172427 A1* | 7/2010 | Kleider et al. ............... 375/260 |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |

FOREIGN PATENT DOCUMENTS

| | | |
|---|---|---|
| EP | 0938204 A1 | 8/1999 |
| EP | 1085684 A2 | 3/2001 |
| EP | 1347584 A2 | 9/2003 |
| EP | 1954019 A1 | 8/2008 |
| GB | 2313020 A | 11/1997 |
| GB | 2330260 A | 4/1999 |
| JP | 2116203 A | 4/1990 |
| JP | 05252559 A | 9/1993 |
| JP | 05327569 A | 12/1993 |
| JP | 05327576 A | 12/1993 |
| JP | 8307172 A | 11/1996 |
| WO | 9603823 A1 | 2/1996 |
| WO | WO 96/13102 | 5/1996 |
| WO | WO 98/04054 | 1/1998 |
| WO | WO-02091618 A1 | 11/2002 |
| WO | 03024027 A1 | 3/2003 |
| WO | WO-2004107783 A1 | 12/2004 |
| WO | WO-2006105185 A2 | 10/2006 |
| WO | WO-2006136811 A1 | 12/2006 |
| WO | WO-2007133630 A2 | 11/2007 |
| WO | 2010090999 A1 | 8/2010 |

OTHER PUBLICATIONS

Written Opinion of the International Searching Authority dated Aug. 21, 2008.
International Search Report dated Aug. 27, 2009.
Written Opinion of the International Searching Authority dated Aug. 27, 2009.
International Search Report for PCT/US2008/000659 mailed Jul. 2, 2008, 6 pages.
Written Opinion of the International Searching Authority for PCT/US2008/000659 mailed Jul. 2, 2008, 7 pages.
International Search Report for PCT/US2008/000663 mailed Jun. 20, 2008, 4 pages.
Written Opinion of the International Searching Authority for PCT/US2008/000663 mailed Jun. 20, 2008, 5 pages.
International Search Report for PCT/US2008/000659 mailed Jul. 30, 2009, 4 pages.
Written Opinion of the International Searching Authority for PCT/US2008/000659 mailed Jul. 30, 2009, 8 pages.
Examiner's Answer to appeal brief for U.S. Appl. No. 12/033,226 mailed Dec. 6, 2012, 9 pages.

(56) References Cited

OTHER PUBLICATIONS

Non-final Office Action for U.S. Appl. No. 13/967,676 mailed Nov. 7, 2014, 20 pages.

Arnold et al., "High Gain, Temperature Compensated EHF Gallium Arsenide Mesfet Amplifier," Conference Proceedings—European Microwave Conference, Sep. 1984, pp. 494-499.

Borisov, E.V., "Temperature Stabilization of the Qualitative Characteristics of Selective Amplifiers," Telecommunications and Radio Engineering, Part 2, vol. 32, No. 12, Dec. 1977, pp. 100-102.

Dow et al., "Monolithic Receivers with Integrated Temperature Compensation Function," Technical Digest, GaAs Symposium, Jan. 1992, pp. 267-270.

Winslow, T.A., Principles of Large-Signal MESFET Operation, Microwave Theory and Techniques, IEEE Transactions, vol. 42, No. 6, Jun. 1994, pp. 935-942.

Winslow, T.A., "Simulated Performance Optimization of GaAs MESFET Amplifiers," Proceedings of the IEEE/Cornell Conference on Advanced Concepts in High Speed Semiconductor Devices and Circuits, presented Aug. 5-7, 1991, pp. 393-402.

Yoo, Kisuk, "Constant Gain Radio Transmitter for Temperature and the Different Levels of Input Signal," IEEE Vehicular Technology Conference, vol. 2, presented May 4-7, 1997, pp. 691-694.

Non-final Office Action for U.S. Appl. No. 13/967,676 mailed Dec. 11, 2013, 16 pages.

Final Office Action for U.S. Appl. No. 13/967,676 mailed Mar. 12, 2015, 19 pages.

Decision on Appeal for U.S. Appl. No. 12/033,226 mailed Aug. 5, 2015, 6 pages.

Final Office Action for U.S. Appl. No. 13/967,676 mailed Jul. 2, 2014, 13 pages.

Advisory Action for U.S. Appl. No. 13/967,676 mailed Aug. 25, 2014, 3 pages.

\* cited by examiner

METHOD AND SYSTEM FOR IMPROVING UPLINK PERFORMANCE

CROSS-REFERENCE TO RELATED APPLICATIONS

This application claims any and all benefits as provided by law of U.S. Provisional Application No. 60/890,587 filed Feb. 19, 2007, which is hereby incorporated by reference in its entirety.

This application is related to U.S. application Ser. No. 12/033,226, filed on Feb. 19, 2008, which is hereby incorporated by reference in its entirety.

STATEMENT REGARDING FEDERALLY SPONSORED RESEARCH

Not Applicable

REFERENCE TO MICROFICHE APPENDIX

Not Applicable

BACKGROUND

1. Technical Field of the Invention

The present invention is directed to improvements for distributed antenna systems and more particularly to methods and systems for improving uplink communications.

2. Description of the Prior Art

Distributed Antenna Systems (DAS) are used to provide and/or enhance coverage for wireless services such as Cellular Telephony and Medical Telemetry inside buildings and campuses. The general architecture of a DAS is depicted in FIG. 1.

The DAS 100 typically includes a source 102 (a transmitter, receiver or transceiver for sending and/or receiving a signal), a main aggregation point 104, one or more remote or intermediate aggregation points 122, 124, 126 and two or more antennae 132, 134, 136 connected to the remote/intermediate aggregation points. The DAS can also include one or more terminals 140 for transmitting signals to and receiving signals from one or more of the antennae.

In referring to the signal flows in DAS systems, the term Downlink signal refers to the signal being transmitted by the source transmitter (e.g. cellular base station) to the terminals and the term Uplink signal refers to the signals being transmitted by the terminals to the source receiver.

Most wireless services have both an uplink and a downlink, but some have only a downlink (e.g. a mobile video broadcast service) or only an uplink (e.g. certain types of medical telemetry).

One measure of signal quality for a wireless signal is its Signal-to-Noise-Ratio (SNR). It represents the ratio of the relative power level of the desired signal to the power level of the undesired noise in the bandwidth specific to that signal. The higher the SNR, the "better" the signal is. Every receiver requires a minimal level of SNR in order to be able to correctly demodulate and/or decode the received signal. In the vicinity of the transmitter (such as a wireless terminal) which emits the signal, the SNR would typically be very high.

On its path to the receiver, the SNR of the uplink signal can decrease in one of two ways. In one way, the level of the signal is attenuated while the noise level remains constant. This is typical of the propagation of the signal in the air and through any passive elements of a DAS system. In another way, the level of the signal remains constant or is increased, but the noise level increases even more. This is typical of the propagation of a signal through active elements in a DAS such as amplifiers.

It should be noted that when multiple uplink paths are combined, as is the case in virtually every DAS, the resulting noise level is a combination of the noise levels of the different paths, while the resulting signal level would typically be equal to the highest signal level encountered on any single path (the typical situation would be for the signal level to be high on one branch of the DAS, corresponding to the area where the terminal generating the signal is located, and very low or non-existent on other branches). As a result, aggregating multiple uplink paths increases the noise level and therefore reduces the SNR of the uplink signal.

A qualitative analysis of the degradation of the uplink SNR can be achieved by tracing the path of the uplink signal from terminal to receiver. A generic diagram of an uplink path 200 is depicted in FIG. 2. Each such stage of the signal path can have an impact on the SNR.

Propagation through the air 212 attenuates the level of the signal, and the attenuation is greater for higher frequency signals than it is for lower frequency signals. The noise level, in the best case, is the inherent environmental noise, usually referred to as Thermal Noise. Typically, the level of this noise is −174 dBm/Hz. In some cases, the environment may exhibit a higher level of noise in the specific frequency range in which the signal of interest operates.

Generally, most of the SNR deterioration occurs in this segment of the path, since the signal attenuation in the air 212 is typically much worse than in any passive segment of the DAS (e.g. coax cable). One way to decrease the signal attenuation in this segment is to shorten the maximal distance between a terminal and the closest DAS antenna to the terminal, or increase the number of antennas covering each area (and thus increase their density and decrease the distance between them). However, there is a cost penalty associated with doing this.

The passive section 214 of the DAS 200 is defined as the series of passive elements (antenna, cables, filters, combiners, attenuators, etc.) that precede the first active gain element (amplifier) in the uplink path. Propagation through the passive section 214 of the DAS 200 typically attenuates the level of the signal. However, the antenna may increase the signal level, if it has positive gain in the frequency range of interest. In a well designed DAS 200, the passive section 214 will maintain the level of noise at the Thermal level and might possibly reduce the noise to the Thermal level if, for example, it was higher coming into this section. On balance, the passive section 214 will typically decrease the SNR of the signal, more severely impacting signals of higher frequency.

Within the active portion 126 of the DAS 200, the level of the signal can be controlled by adjusting the gain of the amplifiers in the different system elements. An amplifier however, introduces a minimal noise level which is typically higher than the Thermal noise level and increases commensurate with the gain of the amplifier, and thereby will always decrease the SNR of the signal.

At each aggregation point 218, the noise levels of the different branches are combined. Since typically each uplink signal originating from a specific terminal will be present on only one of the DAS 200 branches being combined in the aggregation point 218, the signal level of the combined signal (assuming unity gain) will be the same. The signal level does not change, while the noise level increases, and therefore the SNR is impaired. In an aggregation point 218 with N branches the increase in noise level, and therefore the decrease in SNR, expressed in dB would be 10 log N.

SUMMARY

The design and configuration of DAS systems can differ in the combinations of cabling they use (fiber, coax, CAT-5/6, etc.), the points in the signal path that are active (i.e include power amplification) as compared to those which are passive, as well as other aspects. The approach described in this document applies in general to any DAS architecture.

In accordance with the inventions, the following terminology is typically used:

Path Loss: the attenuation (or deterioration in SNR) that the signal undergoes as it propagates from the terminal to the nearest DAS antenna (expressed in dB).

DAS uplink Noise Figure (NF): the impact of the DAS on the SNR of the uplink signal (expressed in dB). The DAS NF is assumed to include the antenna gain.

Link Budget: the maximal SNR deterioration allowed in the path from the terminal to the receiver (expressed in dB). The sum of the Path Loss and the DAS uplink NF must not exceed the Link Budget.

We define the Uplink Performance of a DAS system as the degree to which it degrades the SNR of an uplink signal. This is usually referred to as the uplink Noise Figure (NF) of the system. For a given Link Budget, improved Uplink Performance can be leveraged in one of or a combination of the following two ways.

One way is to increase the spacing between the antennas, and thus decrease the number of antennas required to cover a given area. The increase in Path Losses, can be offset by the decrease in uplink NF to maintain the Link Budget and reduce the cost of the DAS.

The second way is to increase the total area that can be covered by a DAS system connected to a single receiver/transmitter. This follows from the fact that adding another branch to the DAS (to extend the coverage area) increases the NF of the DAS. However, if the NF of each branch is improved, the cumulative NF decreases and more branches can be added. Theoretically, any improvement of 3 dB in the NF of a single branch would allow for a doubling of the coverage area.

The benefits of increasing the coverage area of a DAS include: 1) For networking technologies that support sectorization (such as cellular networks), the ability to extend the coverage area associated with a single sector means that potentially less base-station equipment is required to cover a given area; 2) Some networking technologies, such as certain types of medical telemetry, do not support sectorization, meaning in essence that the whole coverage area must be connected to a single receiver/transmitter. In this case, the ability to increase the coverage area associated with a single receiver directly impacts the total coverage area in which this wireless service can be made available.

Another factor that impacts the uplink performance of a system is its Dynamic Range, the range of power levels, lowest to highest, that the system can handle. In a system composed of a well-designed DAS and a receiver, the receiver would typically have the more restricted dynamic range. The effect that a restricted dynamic range can have on a DAS deployment can be explained as follows. The strongest uplink signal is created when the terminal is as close as would be physically allowed to one of the DAS antennas (the Path Loss is the smallest possible). The weakest uplink signal is created when the terminal is as far away as is physically allowed from its nearest DAS antenna. The difference between the strongest signal and the weakest signal as described above must not exceed the dynamic range of the system. Since there is no way to limit the strongest signal, the only available way is to ensure the weakest signal is not too weak. As explained above, this can be accomplished by decreasing the distance between the antennas, with the associated negative financial impact.

A method that would allow a DAS to "smooth" out the differences between strong and weak uplink signals would help in overcoming the dynamic range limitations of the receiver and thus would allow for increasing the antenna spacing and the associated positive financial impact. Thus, improving the Uplink Performance of a DAS, and more particularly, its Dynamic Range behavior can provide tangible economical and functional benefits to a DAS.

In accordance with the invention, the SNR at an aggregation point can be improved by blocking or filtering the noise attributed to one or more of the branches that do not carry the signal. This can be accomplished by detecting whether there is signal activity from a particular terminal on any branch connected to an aggregation point and selectively blocking or filtering the input noise to be aggregated from one or more of the other branches connected to the aggregation point.

In accordance with the invention, the SNR of the uplink path can be improved by regenerating the signal at one or more points along the uplink path. This can be accomplished by using an Uplink Regeneration Block (URB) which can demodulate the signal and then re-modulate the signal at a very high SNR. While URBs can be located anywhere in the uplink signal path, there is a cost/performance tradeoff that can be used as a guide for determining the location and how may URBs are used. To reduce costs, the URBs can be located upstream of aggregation points in order to reduce the number of URB's used (lower cost) and improve the SNR of the aggregated signal, but to improve performance, the URBs should be located as far downstream as possible before the SNR has been deteriorated by the aggregation points (however many more URBs may be required).

These and other capabilities of the invention, along with the invention itself, will be more fully understood after a review of the following figures, detailed description, and claims.

DETAILED DESCRIPTION OF PREFERRED EMBODIMENTS

Figure 1:
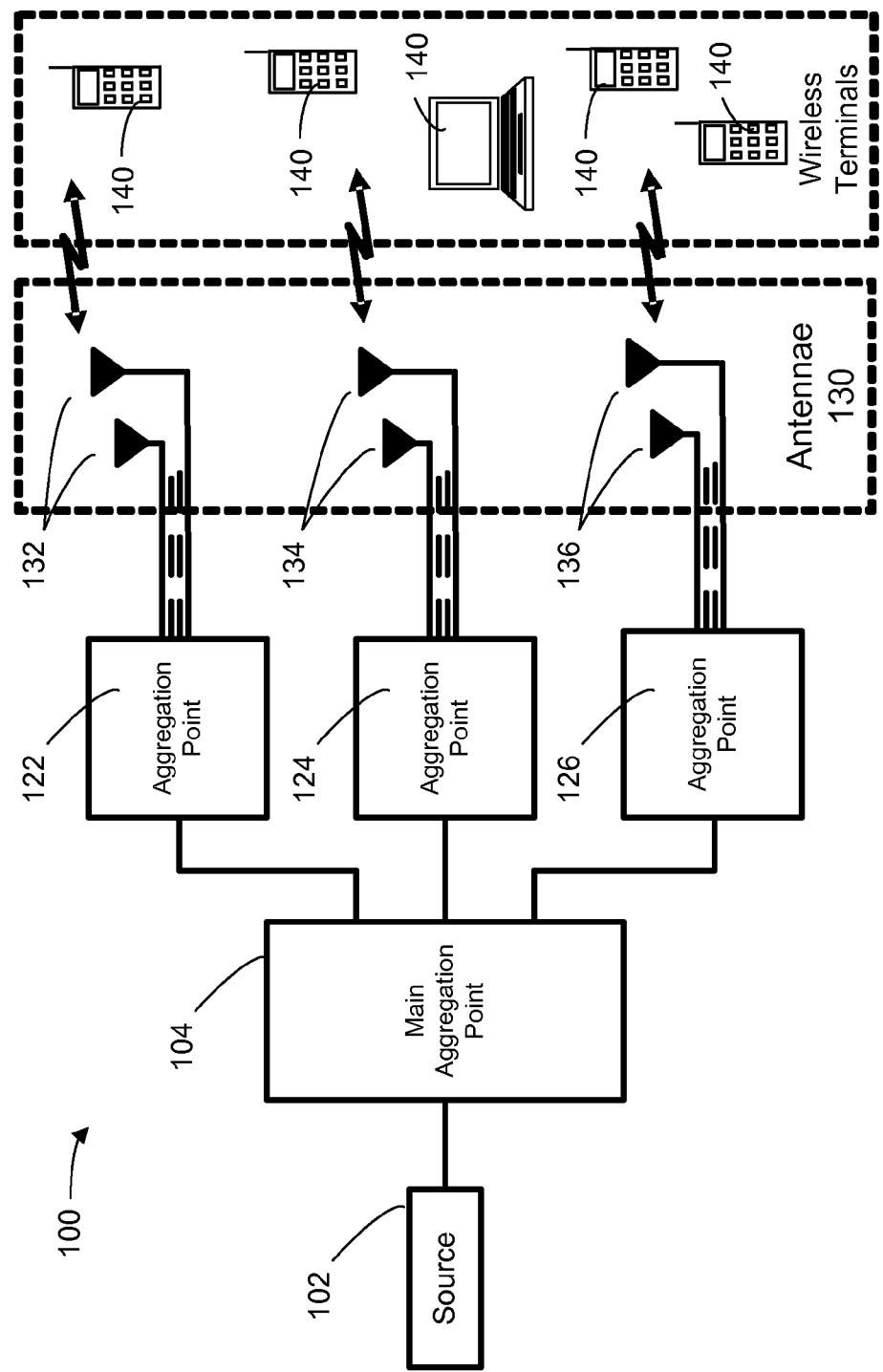
FIG. 1 is a diagram of a distributed antenna system.
Figure 2:
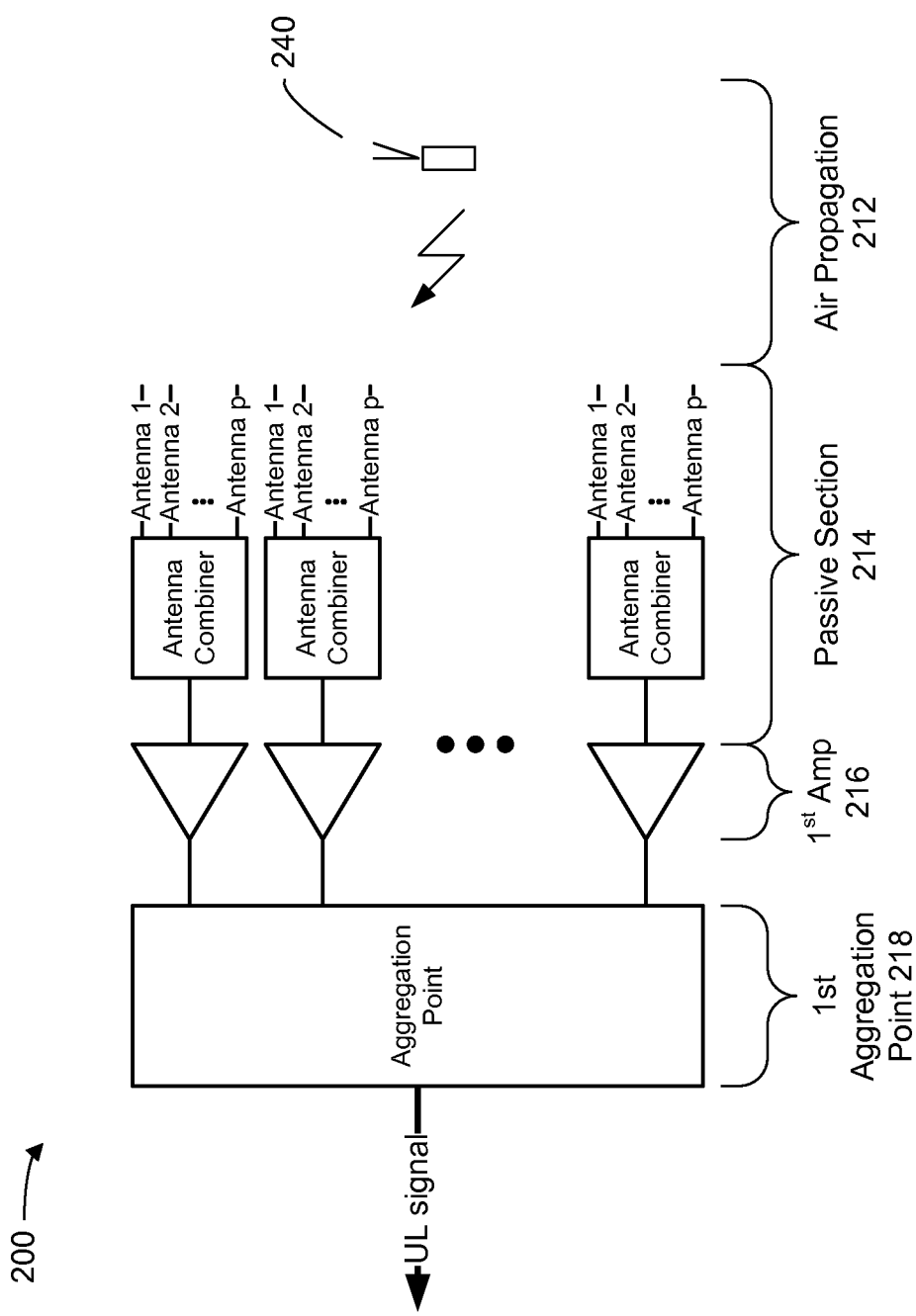
FIG. 2 is a diagrammatic view of an uplink path.

In accordance with the invention, two methods and systems for improving the Uplink Performance of a DAS are disclosed. Both methods allow for dynamic range "smoothing", and thus further contribute to improving the uplink performance.

The Aggregation Point Noise Blocking (APNB) method and system minimizes noise accumulation in aggregation points of the DAS.

The Signal Regeneration method and system, includes regeneration of the signal along the uplink path of the DAS is order to improve the signal SNR to the values typical to a signal from a nearby transmitter.

Aggregation Point Noise Blocking

As explained above, at the aggregation points in the DAS, the noise from the various branches being aggregated is combined, thereby increasing the noise level, while the signal from a specific terminal, which typically would be present only on a single branch, does not increase accordingly. The result is a decrease in SNR which is proportional to the number of branches being aggregated.

According to the APNB invention, at any point in time the signal from a particular terminal is present only on one of the branches and there is no need to combine this signal with noise from other branches, so the noise from one or more of these branches can be blocked. The result is the elimination of the noise aggregation phenomena and its impact on the SNR.

In the case of a single terminal roaming the coverage area of the DAS, this "blocking" function would simply be the selection at every point in time of the single branch on which the terminal signal is present and the complete blocking of all other branches. However, a practical wireless system support multiple terminals, each of which can be located in a coverage area associated with a different branch of the aggregation point, and therefore a more granular "blocking" method can be used. The mechanism can be tailored to the specific wireless signals being handled by the DAS, and in particular to the technique being used to multiplex the signals of multiple terminals within the associated bandwidth.

One embodiment of the invention includes Frequency-based Multiplexing, a method and system in which each terminal is assigned a unique, non-overlapping frequency ("channel") on which to transmit its uplink. All channels are assumed to have the same bandwidth. The blocking mechanism appropriate for Frequency-based systems would be one in which the system determines which channels are active on each branch and blocks (filters) the parts of the band associated with channels that are not active on that branch. Since a channel is assumed to be active on a single branch, it follows that, for every channel, the associated frequency slice will be passed through from a single branch and blocked on all other branches. The result will be the elimination of the noise accumulation from multiple branches.

Another embodiment of the invention includes Time-based Multiplexing, a method and system in which a single frequency channel is used by all terminals but each accesses the channel at a different time or time slot. Time-based systems may differ in whether the allocation of channel time to each terminal is structured and slotted or more "random". Their shared property is that at every point in time only a single terminal is transmitting. The blocking mechanism appropriate for Time-based systems would be one in which the system determines at every point in time the branch on which the active terminal for that time frame is present, and blocks all other branches. As before, the result will be the elimination of the noise accumulation from multiple branches.

Another embodiment of the invention includes Hybrid Frequency/Time-based Multiplexing, a method and system in which a time-based multiplexing scheme is employed concurrently (and independently) over multiple frequency channels. Thus each terminal will be active at certain times over a specific frequency channel. Examples of such systems include the iDEN, TDMA and GSM wireless telephony systems (which have a structured time multiplexing nature) and 802.11-based wireless LAN systems (which use a dynamic, contention-based scheme to ensure that at most a single terminal is active on every channel at every point in time). The blocking mechanism appropriate for hybrid frequency/time multiplexing systems is a hybrid of the respective blocking mechanisms for the frequency-based and time-based systems. In other words, at every point in time the system must determine which channels are active on which branches, and for the duration of that activity cycle must block the frequency associated with that channel on the other branches.

In accordance with one embodiment of the invention, the APNB method and system can provide the following functions, Activity Identification, Selective Noise Blocking, and Signal Attenuation. The Activity Identification function can determine which frequency channel is active on which branch at every point in time or for every time slot. This can include the recognition that it is possible that a signal emanating from a specific terminal can be present on more than one branch as when the terminal is located on the border between coverage areas associated with different branches. In this case the branch having the strongest signal for this terminal can be selected. The Selective Noise Blocking (SNB) function can provide that for every active channel, passing the signal from the "selected" branch through the aggregation point, and blocking the corresponding frequency range from other branches. The Signal Attenuation function can assist in dynamic range "smoothing" by attenuating strong signals.

The Activity Identification (AID) function can be tailored to the characteristics of the signal and the mobility characteristics of the terminals. For example, where the terminals in the system are of limited mobility, a manual configuration method can be used. In this configuration, an operator of the system manually configures the channels active on each branch, and for a time-based or hybrid time/frequency based scheme the time slot or time-slot/channel assignments associated with each branch.

In one embodiment of the invention, for example for a system having truly mobile terminals, an automatic scanning implementation can be used. In this embodiment, each branch is scanned for activity according to predefined time-slot and frequency assignments. Alternatively, each of the branches can be scanned simultaneously for activity on each of the possible frequencies that can be used. The nature of the activity detected, including the frequency band or channel, the time-slot (as necessary) and the signal strength (or an analogous measure of signal strength) or signal to noise ratio (SNR) can be sent to the controller. The controller can collect the activity information from each branch and store the information in memory. The controller can use an algorithm to determine, for each time period or time slot, which branches to block as a function of the activity detected on each branch. Where activity for a time period or time-slot is detected on only one branch, the other branches can be blocked. Where activity for a time period or time-slot is detected on more than one branch, but the activity is on the same frequency or channel, the branch corresponding to the activity with the greater signal strength or SNR can be allowed to pass to the combiner and the other channels blocked. Where the activity for a time period or time-slot is detected on more than one branch and includes multiple frequencies or channels, the controller can control each of the branches to selectively block or filter the branch to allocate only one branch for each frequency or channel over which activity was detected. In some alternative embodiments where signals from the same terminal are detected on more than one branch, it can be desirable to allow for the two or more signals (one from each of the active branches) to pass through to the combiner.

For each branch in the aggregation point, an Analog to Digital Converter (ADC) and a suitable Digital Signal Processor (DSP) can be used to scan the relevant frequency band for activity (e.g. a signal is present on one or more of known frequency channels) or the cessation of activity. The level of each active signal can be measured. A single ADC/DSP time-shared between the different branches can be used.

A central processing unit or control function can compare the results derived from each branch and create an integrated "activity map". Where a specific channel is "active" on more than one branch, the central processing unit can select the branch having the strongest signal or highest power for that channel. Depending on the application, the controller can be implemented as a hardware based controller, such as part of a digital signal processor or a field programmable gate array, or as a high speed software controlled processor.

The scanning rate can depend on the characteristics of the signal. For frequency-based multiplexing the rate can be relatively slow, while for time-based or hybrid multiplexed systems the rate can be matched to the time-slot duration of the system.

Selective Noise Blocking (SNB)

Based on the "activity map" generated as described above, the system can determine for each and every point in time, which frequency ranges to pass through from a branch where activity was detected and which frequency ranges to block or filter from other branches where no activity was detected. In one embodiment of the invention, for each branch, an ADC is used to digitize the relevant frequency range. A DSP is then used to implement digital filters that pass through the selected frequency channels for this branch and block the rest. The signals from the different branches can be digitally combined, and then a Digital to Analog Converter (DAC) used to recreate an analog signal.

Figure 3:
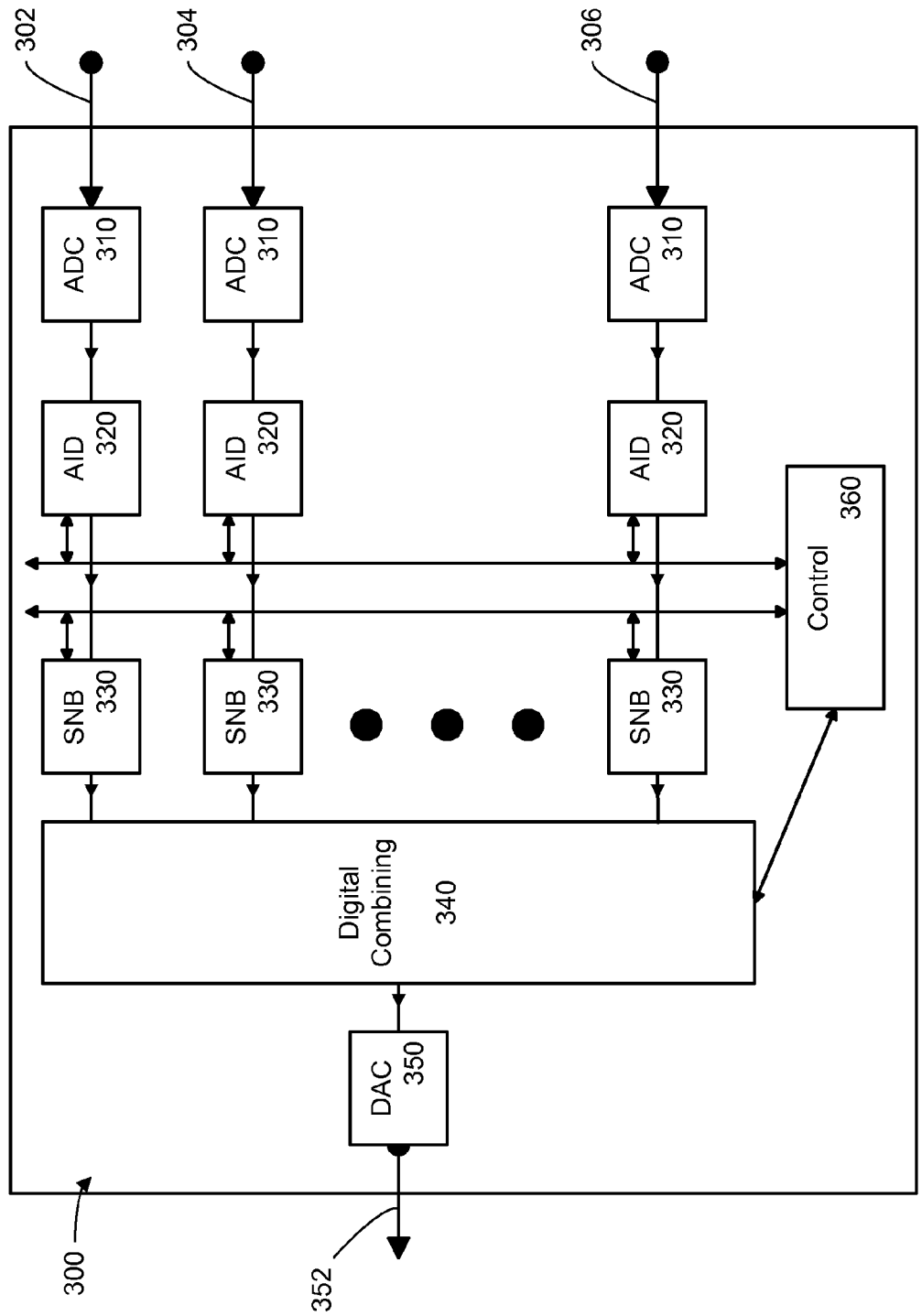
FIG. 3 is a diagrammatic view of an Aggregation Point Noise Blocking system according to the present invention.
Figure 4:
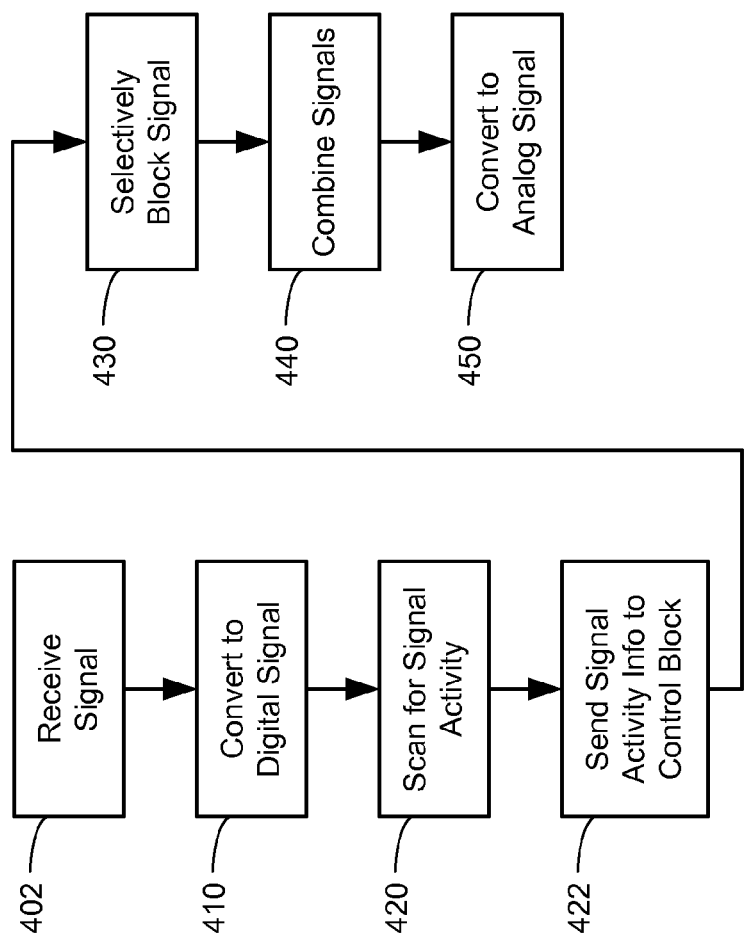
FIG. 4 shows a flow chart of a method for selectively blocking noise at an aggregation point according to the present invention.

FIG. 3 shows a high level block diagram of an embodiment of the invention, an APNB 300 at an aggregation point and FIG. 4 shows a flow chart showing the process for selective noise blocking according to an embodiment of the invention. The APNB 300 can include an ADC 310 connected to each branch 302, 304, 306 to be aggregated, an AID block 320 connected to each ADC 310 to detect signal activity and send signal activity information to the control block 360, a SNB block 330 connected to each AID block 320 to selectively block or filter the signal if no signal activity is detected, a control block 360 for receiving the signal activity map information from the AID blocks 320 and providing the signal activity map information to the SNB blocks 330, a digital combiner 340 for combining the processed and filtered digital signals from each branch and a DAC 350 for converting the combined digital signal to an analog signal 352 to be set upstream. At stage 402 the APNB block 300, the input signal from each branch is processed similarly. At stage 410, each received analog signal 302, 304, 306 is converted to a digital signal by the ADC 3 10. At stage 420, the digital signal is processed by the AID block 320 to determine if signal activity from a terminal is detected. At stage 422, the absence or presence of signal activity can be sent to and stored in the control block 360 as the activity map. At stage 430, the digital signal is then processed by the SNB block 330 to selectively block or filter the signal noise in the digital signal as a function of the absence or presence of signal activity detected or as a function of the activity map or a control signal from the control block 360. At stage 430, the SNB block 330 can also attenuate the digital signal to provide for dynamic range smoothing. At stage 440, each of the digital branch signals is combined in the digital combiner 340 to produce a combined digital signal. At stage 450, the combined digital signal is converted to an analog signal by DAG 350 and sent upstream. The resulting analog signal has an improved SNR because some or most of the noise from the inactive branches is not aggregated into the resulting signal.

It is possible to use the same ADC/DSP elements for both the Activity Identification function and the Selective Noise Blocking function, as well as the digital combining function. In one embodiment, a digital "delay line" can be inserted between the AID block 320 function and the SNB block 330 Function in order to provide the AID block 320 function with time to process the signal or signals before providing the information required for the SNB block 330 function to operate. This can be done using buffering capability associated with the DSP processing blocks.

Dynamic Range "Smoothing"

The APNB 300 mechanism can help "smooth" the dynamic range of the incoming signals by attenuating strong signals. This functionality can be integrated in the implementation described above for the SNB block 330 function. Specifically, the channel power measurements obtained at stage 420 in the AID block 320 function can be used by the SNB block 330 to determine at stage 430 whether a "pass-through" channel needs to be attenuated and if so by how much.

Enhancing Performance with Coherent Combining

In systems where signals can often be expected to be present on more than one branch of the aggregation point (for example, a system with a high density of antennas and where the aggregation point in question is "near" the antennas in the aggregation hierarchy), it is possible to improve the signal SNR even more by performing coherent combining of the signals from multiple branches. This can provide for improved performance in DAS systems were the terminals are highly mobile and move among several antennae. Referring to FIG. 3 above, this functionality could be integrated into the "digital combining block".

Signal Regeneration

In accordance with the invention, the system can regenerate signals along the uplink path such that their SNR is restored to levels typical of signals just being launched from the transmitter or the terminal. An Uplink Regeneration Block (URB) can include an Input Port, through which uplink signals are received at the RF level, and an Output Port, through which the regenerated signals are transmitted, again at the RF level. The URB can demodulate all active signals present on the Input Port. The specific processing will depend on the characteristics of the signal, but in general the functionality would be a subset of the functionality of the receiver typically associated with this signal. Depending on the modulation scheme used, the URB can be used to recover symbols rather than bits and reduce the required processing power. The URB can Re-modulate all demodulated signals and transmit them on the Output Port. The specific processing depends on the characteristics of the signal and the functionality of the previous block, but in general the functionality would be a subset of the functionality of (potentially multiple instances of) the transmitter typically associated with this signal. All regenerated signals can be transmitted at a predefined power level that can be predetermined in order to optimize the performance of the "real" receiver located at the "root" of the DAS.

Figure 5:
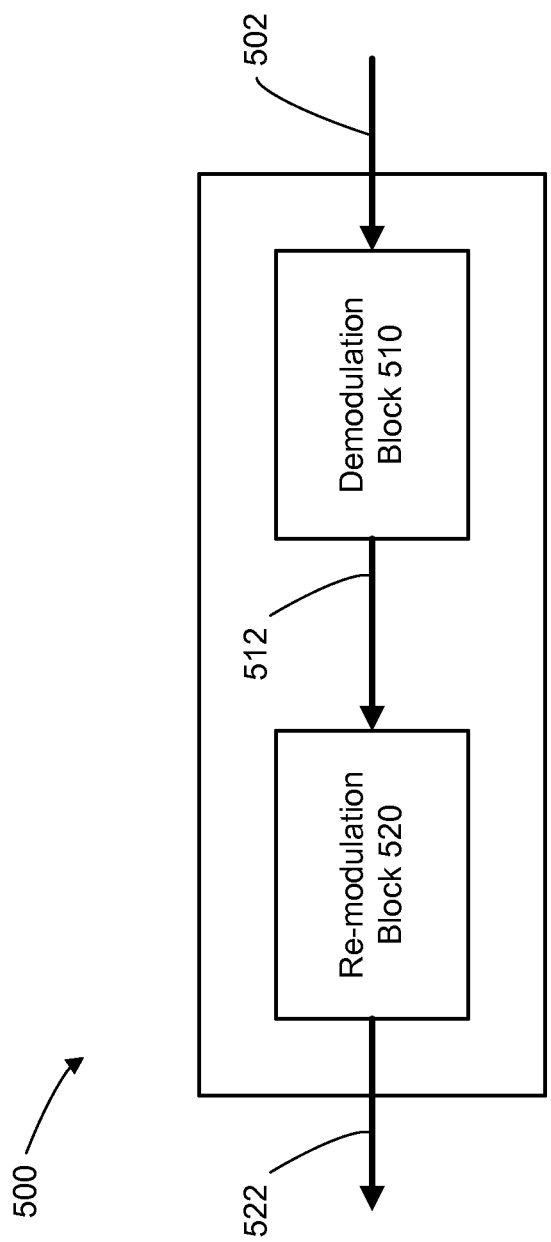
FIG. 5 is a diagrammatic view of an Uplink Regeneration Block according to the present invention.
Figure 6:
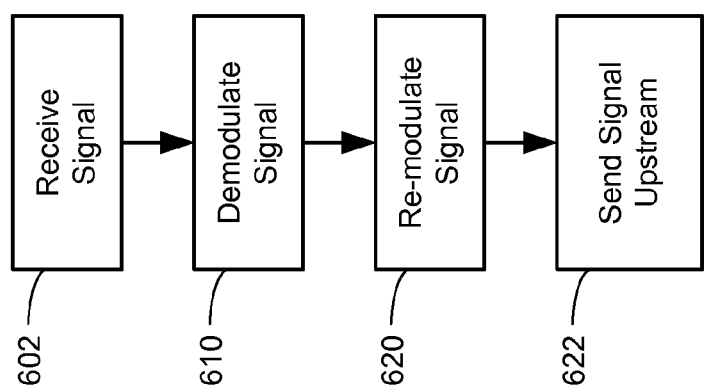
FIG. 6 shows a flow chart of a method for regenerating a signal according to the present invention.

FIG. 5 shows a high-level functional diagram of the Uplink Regeneration Block 500 (URB) and FIG. 6 shows a flow chart of the uplink regeneration process, according to an embodiment of the invention. The URB 500 can include a Demodulation Block 510 for recovering the transmitted information 512 and a Re-modulation Block 520 for, using the recovered information 512, re-generating the modulated signal 522 with a very high SNR. At stage 602, the Demodulation Block 510 can receive the upstream signal 502 and, at stage 610, demodulate the upstream signal 502 to recover the transmitted information 512. At stage 620, the Re-modulation block 520 can use the recovered information 512 to re-generate a modulated signal 522 that has a very high SNR which is sent upstream at stage 622.

In an alternative embodiment, the URB 500 can include a single DSP-enabled processing block (e.g. DSP processor with associated periphery or FPGA with embedded DSP capabilities) to implement both the demodulation and re-modulation. The type and number of DSPs can depend on the signal characteristics and the processing power requirements of the different signals. If the required processing power exceeds that of a single processor, multiple DSPs can be employed in various architectures and configurations.

The regenerated signals can have very high SNR, comparable to a signal sent by the transmitter at the transmitting terminal. By transmitting the signals with the same power level and that level being optimized for the remainder of the uplink path, the Dynamic Range problem can be minimized.

The URBs can be deployed at any point along the uplink path in the DAS. There is, however, an associated cost/performance tradeoff associated with the deployment of URBs at various locations in the uplink path in the DAS. Locating the URBs upstream of aggregation points, after having combined several uplink branches, can reduce the number of URBs used as compared to having a URB on every branch prior to aggregation. Thus, from a cost perspective, the URBs can be located as upstream as possible. However, the greater improvement in Uplink Performance can be achieved by having the URBs further downstream, before the SNR of the received signal has been deteriorated by noise aggregation in the DAS. The reason is that the signals being regenerated by the URB are expected to have such a high SNR that the degradation caused by the DAS system would not impair at all the ability of the "main" receiver at the "root" of the DAS to correctly decode the signals and the main receiver is no longer the limiting factor of the system. Instead, the limiting factor would be the ability of the demodulation block in the URB to decode the signals, based on the SNR of the signals at its Input Port. From a system performance perspective therefore, the effective NF of the DAS could be considered the NF of the segment of the DAS up to the location of the URB. Thus placing the URB as far downstream as possible, before the SNR has been degraded by the DAS aggregation points, is likely to provide better performance but at a higher cost because more URB's may be used.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description can include more than one invention.

What is claimed is:

1. A distributed antenna system comprising:
a plurality of remote units, each remote unit comprising at least one antenna; and
at least one signal regeneration component, the signal regeneration component coupled with at least one of the plurality of remote units via an input port, including:
a demodulation block adapted to demodulate all active input signals present on the input port and extract symbol information carried by each of the active input signals; and
a re-modulation block adapted to receive the extracted symbol information and to re-generate a signal of symbols for each of the active input signals for transmission through the distributed antenna system.

2. A distributed antenna system according to claim 1 wherein the re-modulation block generates a signal having a greater signal to noise ratio than the active input signals.

3. A distributed antenna system according to claim 1 wherein the re-modulation block produces the generated signal at a power level optimized for transmission through the distributed antenna system.

4. A distributed antenna system according to claim 1 further comprising at least one aggregation point and at least two uplink branches connected to the aggregation point, and the signal regeneration component is disposed upstream from the aggregation point.

5. A distributed antenna system according to claim 1 further comprising:
at least one aggregation point and at least two uplink branches connected to the aggregation point, and
at least one signal regeneration component disposed in at least one uplink branch, downstream of the aggregation point.

6. A method of transmitting a signal through a distributed antenna system comprising:
providing a plurality of remote units, each remote unit having at least one antenna;
providing a plurality of signal regeneration components, each signal regeneration component coupled with at least one remote unit among the plurality of remote units via an input port;
at least one of the signal regeneration components demodulating all active input signals present on the input port to extract symbol information carried by each of the active input signals; and
re-modulating the extracted symbol information to re-generate a signal of symbols for each of the active input signals adapted for transmission through the distributed antenna system.

7. A method according to claim 6 wherein the re-generated signal has greater signal to noise ratio than the active input signals.

8. A method according to claim 6 wherein the generated signal is produced at a power level that is optimized for transmission through the distributed antenna system.

9. The method of claim 6, further comprising detecting whether there is signal activity from a particular terminal on any branch of the distributed antenna system connected to an aggregation point within the distributed antenna system.

10. The method of claim 6, further comprising selectively blocking input noise to be aggregated from one or more branches of the distributed antenna system connected to an aggregation point within the distributed antenna system.

11. The distributed antenna system of claim 1 further comprising an aggregation point and a plurality of branches coupled to the aggregation point, wherein the aggregation point comprises the at least one signal regeneration component.

12. The distributed antenna system of claim 11 wherein the system detects whether there is signal activity from a particular terminal on one of the plurality of branches.

13. The distributed antenna system of claim 11 wherein the system further selectively blocks input noise to be aggregated from one or more of the plurality of branches connected to the aggregation point.

14. A distributed antenna system comprising:
a plurality of antennas;
a plurality of signal regeneration components, at least one signal regeneration component coupled with each of the plurality of antennas via an input port, each signal regeneration component including:
  a demodulation block adapted to demodulate all active input signals present on the input port and extract symbol information carried by each of the active input signals; and
  a re-modulation block adapted to receive the extracted symbol information and to re-generate a signal of symbols for each of the active input signals for transmission through the distributed antenna system.

15. The distributed antenna system of claim 1, wherein the at least one signal regeneration component is comprised of a plurality of signal regeneration components, each signal regeneration component among the plurality of signal regeneration components associated with a remote unit among the plurality of remote units.

16. The method of claim 6, comprising providing the plurality of signal regeneration components, each signal regeneration component associated with a respective remote unit among the plurality of remote units.

17. The distributed antenna system of claim 14, wherein the at least one signal regeneration component is comprised of a plurality of signal regeneration components, each signal regeneration component among the plurality of signal regeneration components associated with an antenna among the plurality of antennas.

18. The distributed antenna system of claim 1, wherein the signal re-generated by the re-modulation block has greater signal to noise ratio than the active input signals demodulated by the demodulation block.

* * * * *